5961X
J. JENNINGS.
COOKING APPARATUS.
Patented May 14, 1830.
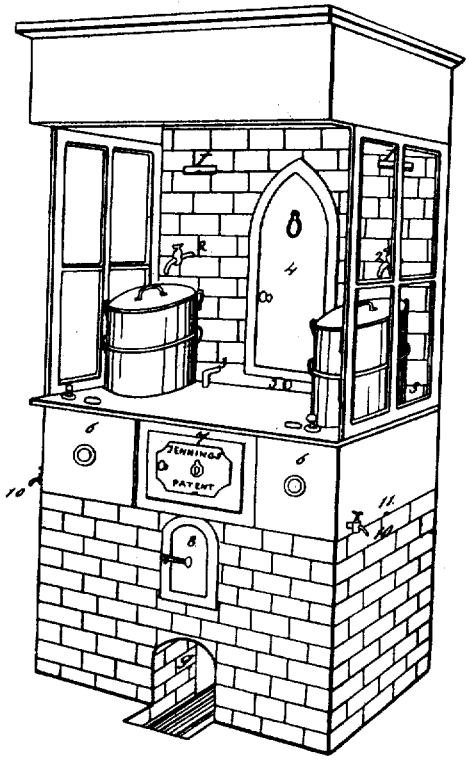
THE NORRIS PETERS CO., PHOTO-LITHO., WASHINGTON, D. C.

X5961 May 14-1830 487

Joseph Jennings of the City of New York,

The schedule referred to in these Letters Patent and making part of the same containing a description in the words of the said Joseph Jennings himself of his improvement in the combination of a cooking apparatus with a Hot Air Furnace.

---

To all to whom these presents shall come.

Be it known that I, Joseph Jennings of the City of New York, have invented a new and useful improvement in the combination of a cooking apparatus, with a hot air furnace, for the use of Dwelling, and other Houses, by which combination, I am not only capable of performing all that is required for culinary purposes (viz) Roasting, Boiling, Baking, Frying, Broiling, Stewing &c but also of heating every apartment in the house, at any agreeable temperature by conducting the hot air through pipes or flues. I prefer the cooking apparatus set over the furnace as described in the drawing deposited in the Patent Office, but it may be placed at the side or otherwise. The furnace may be of Iron, Brick or any other material that may be preferred, the one referred to in the drawing is of cast Iron, Any fuel will do, but I prefer Anthracite Coal.... The above is a full and exact description of my said invention and improvement by me.

Witness my hand this sixteenth day of April 1830.

Witnesses
A.B. Jones
Anne Jennings

Jos. Jennings.

Exd.
W.J.C.

Patented 14th May 1830.

243 words